United States Patent
Bertolini et al.

(10) Patent No.: US 12,301,111 B2
(45) Date of Patent: May 13, 2025

(54) VOLTAGE REGULATOR DEVICE

(71) Applicant: STMicroelectronics S.r.l., Agrate Brianza (IT)

(72) Inventors: Alessandro Bertolini, Vermiglio (IT); Alberto Cattani, Cislago (IT); Alessandro Gasparini, Cusano Milanino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 211 days.

(21) Appl. No.: 18/089,736

(22) Filed: Dec. 28, 2022

(65) Prior Publication Data
US 2023/0216404 A1    Jul. 6, 2023

(30) Foreign Application Priority Data
Jan. 3, 2022    (IT) .................. 102022000000017

(51) Int. Cl.
*H02M 3/158*    (2006.01)
*H02M 1/00*    (2006.01)
*H02M 1/08*    (2006.01)
*H02M 3/156*    (2006.01)
*H02M 3/157*    (2006.01)

(52) U.S. Cl.
CPC .......... *H02M 3/157* (2013.01); *H02M 1/0003* (2021.05); *H02M 1/0016* (2021.05); *H02M 1/08* (2013.01); *H02M 3/1563* (2013.01); *H02M 3/158* (2013.01)

(58) Field of Classification Search
CPC ............. H02M 1/0003; H02M 1/0016; H02M 1/0032; H02M 1/0035; H02M 1/0038; H02M 1/0041; H02M 1/0054; H02M 1/0058; H02M 1/08; H02M 1/083;
(Continued)

(56) References Cited

U.S. PATENT DOCUMENTS

2004/0263134 A1    12/2004    Hussein et al.
2009/0160414 A1     6/2009    Hachiya et al.
(Continued)

FOREIGN PATENT DOCUMENTS

JP          2013094015 A       5/2013

OTHER PUBLICATIONS

IT Search Report and Written Opinion for priority application, IT 102022000000017, report dated Jul. 31, 2022, 9 pgs.

*Primary Examiner* — Thienvu V Tran
*Assistant Examiner* — Shahzeb K Ahmad
(74) *Attorney, Agent, or Firm* — Crowe & Dunlevy LLC

(57) ABSTRACT

A supply node receives supply voltage and an output node provides a regulated output voltage to a load. A switching transistor is coupled between the supply and output nodes. The switching transistor is controlled by a drive signal generated by a control circuit to control switching activity. The control circuit includes circuitry to sense a feedback voltage indicative of the regulated output voltage and a comparator generating a comparison logic signal dependent on a comparison of the feedback voltage to a reference. A logic circuit generates a skip signal in response to the comparison logic signal. A counter generates a termination signal. Signal processing circuitry controls the switching activity by asserting the drive signal as a function of the skip signal and the termination signal.

17 Claims, 7 Drawing Sheets

(58) Field of Classification Search
CPC .... H02M 3/156; H02M 3/1563; H02M 3/157; H02M 3/158; H02M 3/1582
See application file for complete search history.

(56) References Cited

U.S. PATENT DOCUMENTS

| | | | | |
|---|---|---|---|---|
| 2009/0243580 | A1* | 10/2009 | Chen | H02M 3/156 |
| | | | | 323/288 |
| 2010/0039836 | A1* | 2/2010 | Gong | H02M 3/156 |
| | | | | 363/21.13 |
| 2010/0066328 | A1* | 3/2010 | Shimizu | H02M 3/1588 |
| | | | | 323/282 |
| 2010/0283442 | A1 | 11/2010 | Nakashima | |
| 2016/0373002 | A1* | 12/2016 | Borfigat | H02M 1/32 |
| 2018/0091046 | A1* | 3/2018 | Krueger | H02M 1/08 |
| 2020/0310475 | A1* | 10/2020 | Wang | H02M 1/14 |
| 2023/0038245 | A1* | 2/2023 | Chen | H02M 1/0035 |

* cited by examiner

VOLTAGE REGULATOR DEVICE

PRIORITY CLAIM

This application claims the priority benefit of Italian Application for Patent No. 102022000000017, filed on Jan. 3, 2022, the content of which is hereby incorporated by reference in its entirety to the maximum extent allowable by law.

TECHNICAL FIELD

The description relates to voltage regulator devices, for instance to ways of controlling voltage regulation in such devices.

One or more embodiments may be applied to, e.g., AMOLED, display units.

BACKGROUND

Switching DC-DC power converters are used in a variety of electronic systems. For instance, DC-DC converters can be used to provide a supply voltage level to an AMOLED display unit converting a battery-fed voltage level to a regulated (positive) output voltage level.

Various types of electronic converters are conventionally used, such as "buck" converters, for instance. These types of converters are well known to the person skilled in the art, as evidenced, e.g., by the application note AN513/0393 "Topologies for Switched Mode Power Supplies", L. Wuidart, 1999, STMicroelectronics (incorporated by reference).

DC-DC converters, such as buck-type converters, can be used in a variety of applications.

A conventional implementation of a converter circuit (currently referred to as "time-based") comprises: a (voltage or current) controlled oscillator to perform integration in the phase domain; and delay lines providing a proportional/derivative action.

Depending on the application, in order to provide adequate efficiency and performance levels, a time-based DC-DC converter circuit should desirably work in different modes (e.g., Continuous-Conduction Mode (CCM), Discontinuous-Conduction Mode (DCM), asynchronous mode, synchronous mode, etc.) and be able to operate reliably in different scenarios. In such conditions, the design of a time-based DC-DC converter capable of providing high efficiency and operating across a wide range of load current and input/output voltages is a rather complex task.

For instance, DCM operation may involve a duty-cycle short enough to force the DC-DC converter to "skip" some cycles to maintain regulation. As a result, the output voltage presents an increased ripple. This ripple, in turn, is difficult to manage, as it is due to a largely unpredictable behavior of the converter, influenced by a variety of operative factors.

The term "skip-mode" refers to non-PWM operation where output regulation is performed by changing the switching frequency instead of modulating the duty-cycle.

A particular case of skip-mode operation is PFM (pulse frequency modulation, also called "single-pulse-operation"), where the converter frequency is modulated according to the output load (e.g., the lower the load, the lower the switching activity).

Existing solutions are discussed, e.g., in the reference Kim, et al., "A 10-MHz 2-800-mA 0.5-1.5-V 90% Peak Efficiency Time-Based Buck Converter with Seamless Transition Between PWM/PFM Modes," in IEEE Journal of Solid-State Circuits, vol. 53, no. 3, pp. 814-824, March 2018, doi: 10.1109/JSSC.2017.2776298 (incorporated by reference). There, pulse frequency modulation (PFM) operation, which is commonly used to improve light load efficiency in voltage-mode controllers, is extended to time-based controllers implementing wide bandwidth pulse width modulation (PWM)-based DC-DC converters. In order to maintain high efficiency even in the presence of dynamic load variations, the document discusses techniques to perform switching between PWM/PFM modes.

These existing solutions present one or more of the following drawbacks: large switching losses occurring at high switching frequencies degrade efficiency under light load conditions; clock signals may be involved with frequency values that can be hard to generate/manage in DC-DC devices, e.g., about 100 MHz (1 MHz=1 Megahertz=$10^6$ Hz); the possible presence of a load current sensor and an analog-to-digital converter ADC introduces undesired additional complexity and circuitry; complex intellectual property cores (briefly, IPs) may increase the semiconductor area, especially in the case of circuitry that is robust against process variations, mismatches and different operative conditions; transitions between PFM and PWM modes may involve digital events that can be complex to compensate; the possibility that a natural skip behavior may occur not only at light load, but also at moderate load (when the output setpoint voltage is close to the input voltage, for instance) is not taken into account adequately; a pre-computed look-up table (LUT) can be involved: this is a pre-computed open loop solution valid for specific cases, which is difficult to manage and hardly practical for a wide variety of operative conditions; and various implementations are hardly compatible with high-volume industrial applications.

There is accordingly a need in the art to contribute in overcoming the aforementioned drawbacks.

SUMMARY

One or more embodiments may relate to a device. A voltage regulator may be exemplary of such a device.

One or more embodiments may relate to a corresponding system.

One or more embodiments may relate to a corresponding method.

One or more embodiments exploit an output voltage of an error amplifier as source of information about the duty-cycle.

One or more embodiments facilitate low quiescent current consumption and high converter efficiency over a wide band of load currents.

In one or more embodiments, monitoring the output voltage of an (error) amplifier with a comparator facilitates selecting skip-mode in response to the duty-cycle failing to reach a certain threshold.

One or more embodiments facilitate providing a robust method to implement (forced) skip-mode in time-based DC-DC converters, leading to a deterministic and controlled behavior thereof.

In one or more embodiments, output voltage ripple is a function of a threshold set for a skip comparator (e.g., the smaller the skip comparator hysteresis, the smaller the output ripple).

In one or more embodiments, a switching activity of the converter is automatically reduced and adapted in response to the load current.

One or more embodiments can facilitate, for instance: equalizing coil peak current so that a constant charge is provided to the output within a single cycle during forced skip-mode operation; tuning of a skip frequency, potentially leading to higher values thereof with respect to conventional solutions; reducing the load current threshold value in which the time-based DC-DC enters in forced skip-mode; and providing smooth transition between operating modes, e.g., PWM and skip mode, that is exempt from abrupt variations or digital-like steps.

One or more embodiments present one or more of the following advantages: reduced complexity, e.g., thanks to the absence of current sensor and ADC components; possibility to operate with reduced clock speed, thanks to a constant minimum value of a time interval in which a power switch is in a first ON state; increased flexibility, thanks to dynamical compensation of input/output voltage ratio to maintain a constant peak current value in an inductive load; inherently seamless transition between PWM and skip mode operation; and reduced system complexity and area footprint.

BRIEF DESCRIPTION OF THE DRAWINGS

One or more embodiments will now be described, by way of non-limiting example only, with reference to the annexed Figures, wherein.

DETAILED DESCRIPTION

The figures are drawn to clearly illustrate the relevant aspects of the embodiments and are not necessarily drawn to scale.

The edges of features drawn in the figures do not necessarily indicate the termination of the extent of the feature.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

Throughout the figures annexed herein, like parts or elements are indicated with like references/numerals and a corresponding description will not be repeated for brevity.

For the sake of simplicity, in the following detailed description a same reference symbol may be used to designate both a node/line in a circuit and a signal which may occur at that node or line.

The references used herein are provided merely for convenience and hence do not define the extent of protection or the scope of the embodiments.

Figure 1:
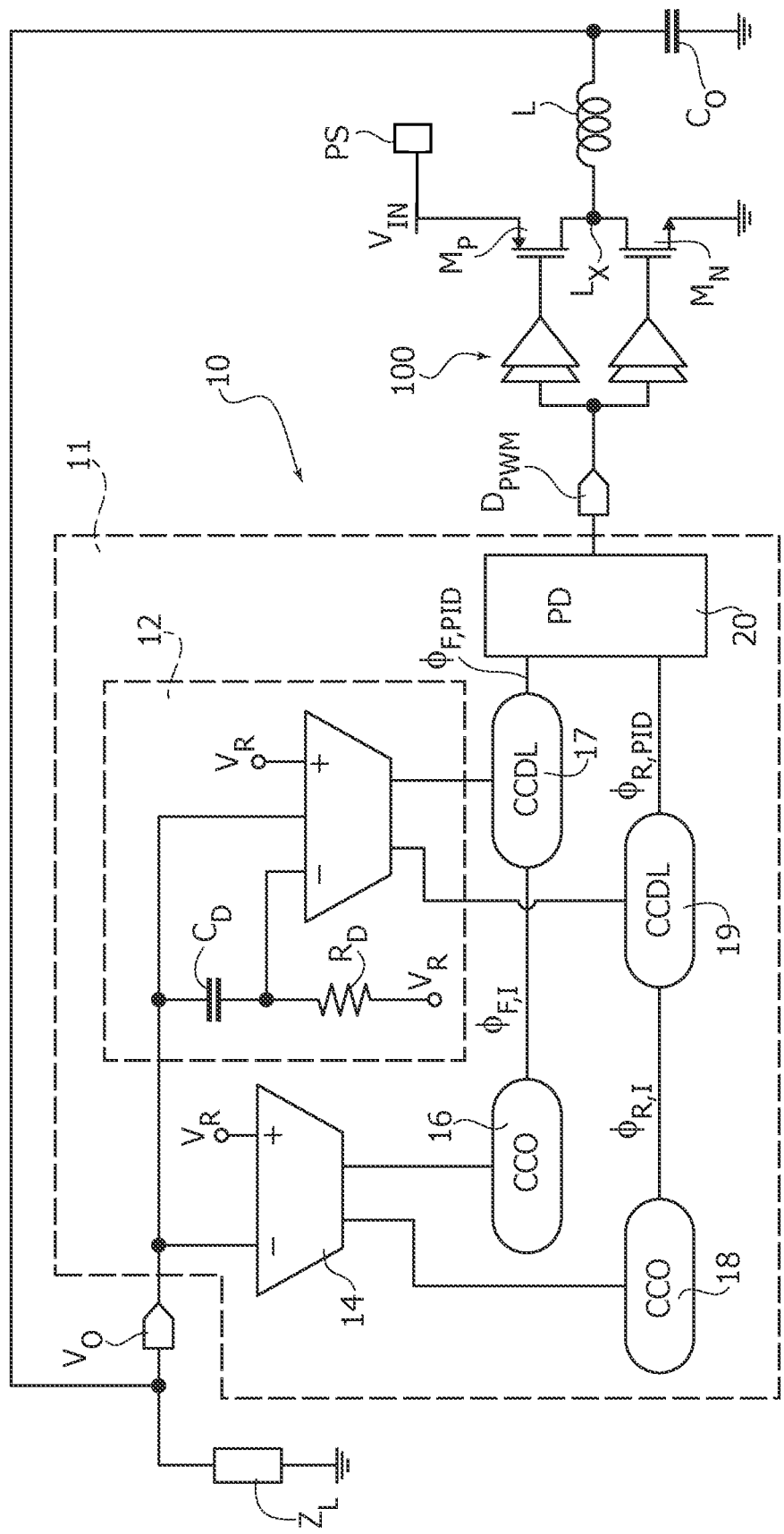
FIG. 1 is a diagram exemplary of a converter circuit.
Figure 2:
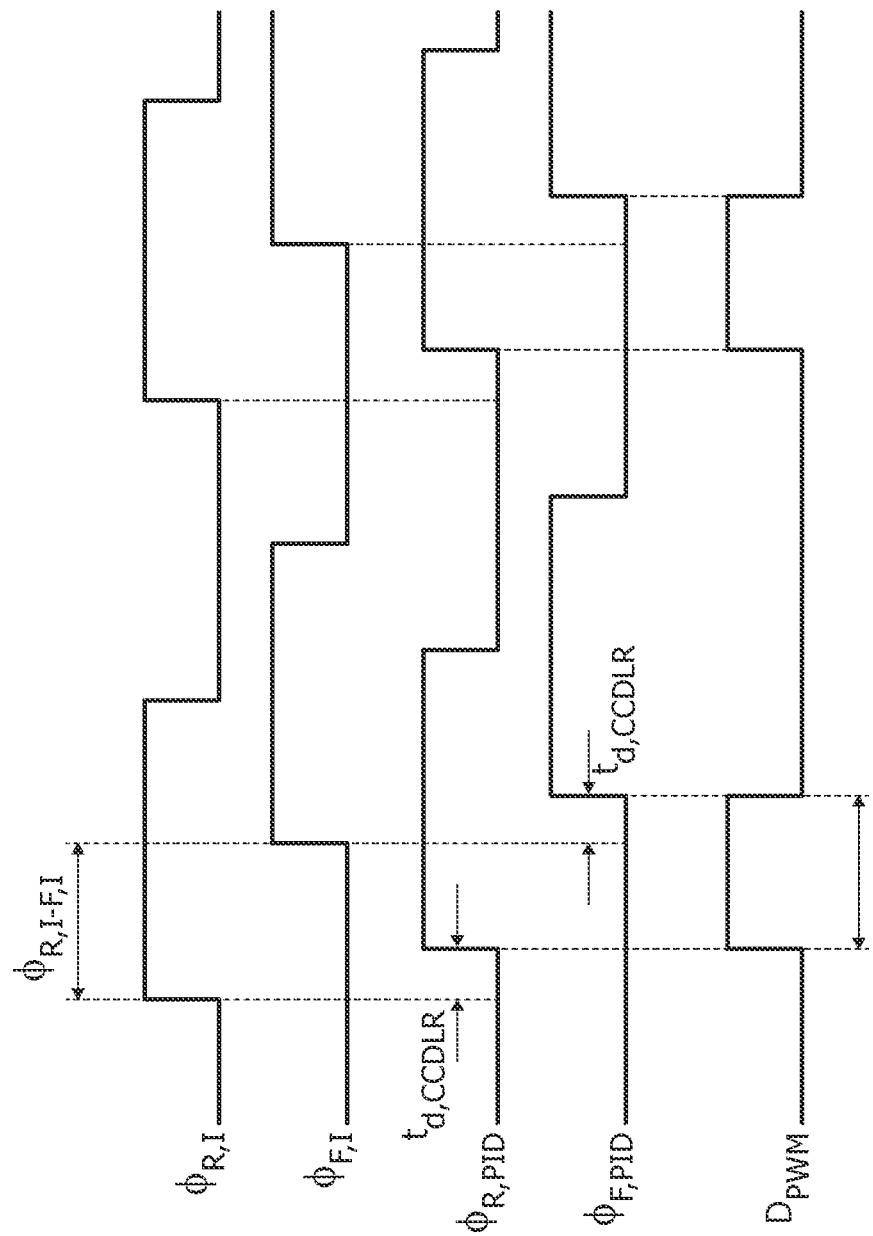
FIG. 2 a diagram exemplary of an evolution over time of signals of the circuit exemplified in FIG. 1.

FIGS. 1 and 2 show a DC-DC voltage regulator or converter 10 (e.g., having a buck topology) and signal waveforms exemplary of respective control signals (e.g., in steady state operation), for instance.

For the sake of simplicity, one or more embodiments are discussed in the following mainly with respect to a voltage regulator having a buck topology. It is noted that this topology is purely exemplary and in no way limiting. One or more embodiments may be notionally applied to any voltage regulator circuit topology.

As exemplified in FIG. 1, the voltage regulator 10 includes a pair of complementary switching transistors $M_P$, $M_N$ comprising a first switching transistor $M_P$ and a second switching transistor $M_N$ coupled in series and sharing a common intermediate node $L_X$ therebetween. A reactive network L, $C_O$ is coupled between the switching node $L_X$ and ground GND. The reactive network L, $C_O$ comprises a series arrangement of an inductive component L and a capacitive component $C_O$ with an (intermediate) output node $V_O$, the output node $V_O$ being configured to provide a regulated output voltage $V_O$ when coupled to a load $Z_L$.

As exemplified in FIG. 1, the first switching transistor $M_P$ has a first transistor node $V_{IN}$ coupled to a (e.g., voltage) supply level provided by a power supply source PS (e.g., a battery), a second transistor node at the intermediate node $L_X$, and a control node configured to receive a first drive signal (e.g., $D_{PWM}$) from the first driver in the set of drivers 100, the first transistor $M_P$ having a current path between the first transistor node $V_{IN}$ and the intermediate node $L_X$ configured to be made conductive in response to the first drive signal received at the control node having a first value.

As exemplified in FIG. 1, the second switching transistor $M_N$ has a respective first transistor node coupled to ground, a respective second transistor node at the intermediate node $L_X$, and a control node configured to receive a second drive signal (e.g., opposite the first drive signal $D_{PWM}$) from the second driver in the set of drivers 100, the second transistor $M_N$ having a current path between the respective first transistor node $V_{IN}$ and the intermediate node $L_X$ configured to be made conductive in response to the second drive signal received at the control node having a second value.

As discussed in the following, the switching transistors $M_P$, $M_N$ are repeatedly turned on and off at a high switching frequency $f_s$ via control circuitry 11.

As exemplified in FIG. 1, the circuit 10 comprises control circuitry 11 coupled to the output node $V_O$ and to the control nodes of the first $M_P$ and second $M_N$ switching transistors to provide thereto the pulse-width modulated (briefly, PWM) control signal $D_{PWM}$ based on a comparison between the output signal $V_O$ and a reference voltage $V_R$.

As exemplified in FIGS. 1 and 2, the control signal $D_{PWM}$ is indicative of frequency and duty cycle for driving switching of the switching transistors $M_P$, $M_N$. For instance, based on the PWM waveform $D_{PWM}$, a set of drivers 100 generates two gate-drive control signals to control the on/off states of complementary power switches $M_P$, $M_N$, as exemplified in FIG. 1, where the set of drivers 100 comprises a first driver configured to be coupled to the control node of the first transistor $M_P$ to provide thereto the first drive signal (e.g., $T_{ON}$) and a second driver configured to be coupled to the control node of the second transistor $M_N$ to provide thereto the second drive signal (e.g., opposite the first drive signal $T_{ON}$).

Preferably, the control circuitry 11 is of the kind currently referred to as "time-based" control circuitry, known per se, so that a detailed discussion of the various components is not repeated here for the sake of brevity.

In brief, current-controlled oscillators (CCOs) 16, 18 provide integral control, current-controlled delay lines (CCDLs) 17, 19 in conjunction with an RC filter CD, RD implement proportional derivative control (per se known), and a phase detector (PD) 20 performs a comparison of the phase of signals output by CCDLs 17, 19 to generate the duty cycle signal $D_{PWM}$.

The controller 11 exemplified in FIG. 1 is hardly compatible with so-called "skip-mode" operation, for instance when the load $Z_L$ is absent. In such a scenario, non-idealities of the conventional control circuitry 10 may become dominant and lead to a potentially unconstrained ripple on the output voltage $V_O$.

Figure 3:
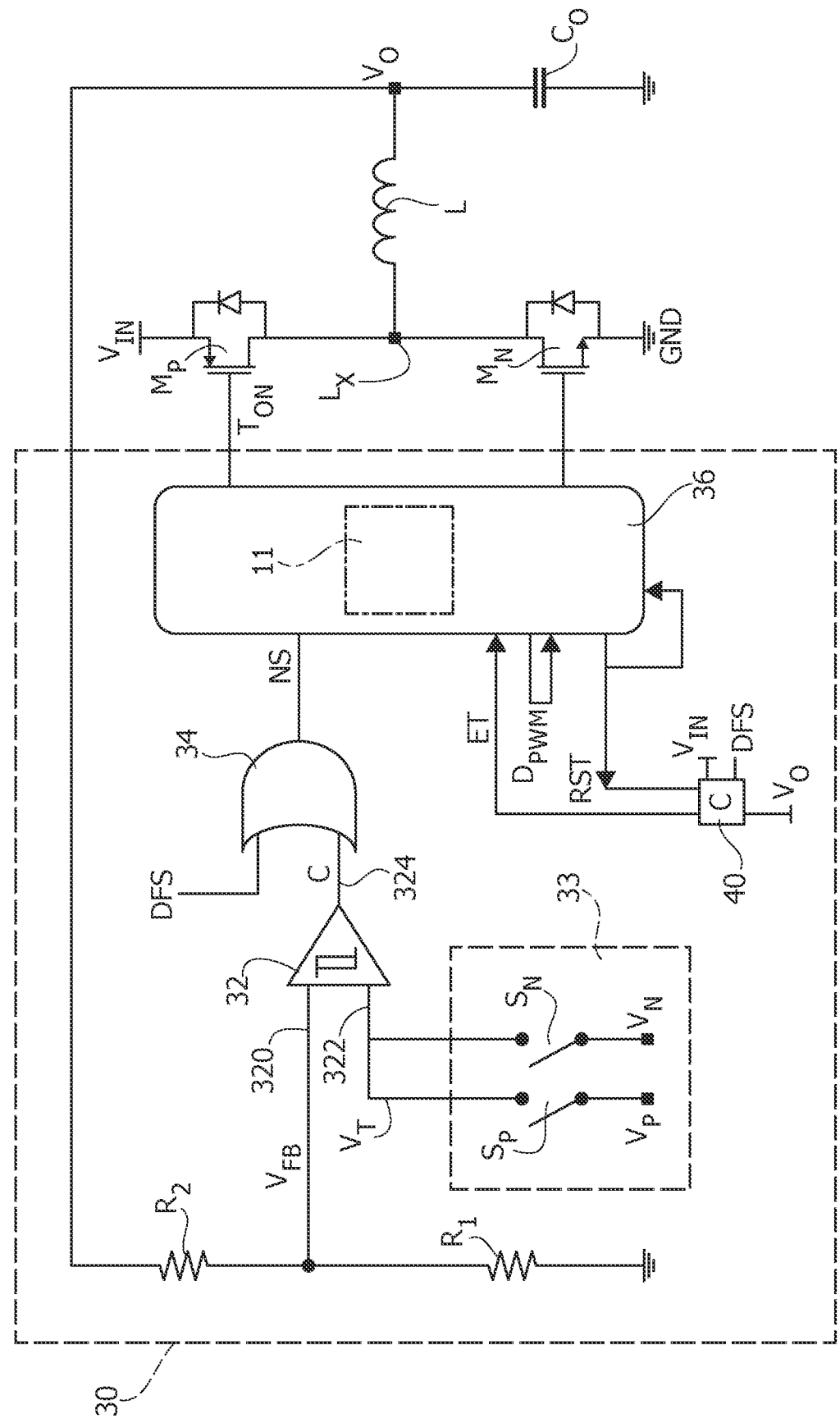
FIG. 3 is a diagram exemplary of a converter circuit.

As exemplified in FIG. 3, a controller 30 configured for driving the switching transistors $M_P$, $M_N$ in skip-mode includes sensing circuitry $R_1$, $R_2$ such as, for instance, a voltage divider $R_1$, $R_2$ coupled to the output node $V_O$ of the regulator 10 to sense the output signal $V_O$ therefrom, the sensing circuitry providing a feedback signal $V_{FB}$ as a result of sensing the output signal $V_O$. A skip comparator 32 has a first (e.g., inverting) input node 320 and a second (e.g., non-inverting) input node 322 and an output node 324. The comparator 32 is configured to receive the feedback signal $V_{FB}$ and to compare it with a threshold level $V_T$ (e.g., corresponding to a setpoint output voltage for the regulator) provided by a threshold selector 33, e.g., comprising alternative switches $S_P$, $S_N$ configured to select one of a positive threshold level $V_P$ and a negative threshold level $V_N$, as discussed in the following. The comparator 32 is further configured to provide a comparison signal C having a first value (e.g., "0") in response to the feedback signal $V_{FB}$ reaching or exceeding the threshold level $V_T$ and a second value (e.g., "1") in response to the feedback signal $V_{FB}$ failing to reach the threshold level $V_T$. A logic OR circuit block 34 is coupled to the output node 324 of the skip comparator 32 to receive the comparison signal C therefrom as a first input and a forcing signal DFS as a second input. The logic OR block 34 is configured to provide a skip signal NS having a same value (e.g., "0") of the comparison signal C in response to the forcing signal DFS having a second value (e.g., "0"), the skip signal NS having a first value (e.g., "1") in any other case. A finite state machine 36 (briefly, FSM) is coupled to the logic OR circuit block 34 to receive the skip signal NS therefrom and coupled to the first $M_P$ and second $M_N$ switching transistors (e.g., directly or via drivers 100) to provide respective complementary drive signals thereto, the drive signals being produced based on the skip signal NS and a set of operating signals ET, $D_{PWM}$, RST, DFS as discussed in the following. A counter (C) 40 is configured to produce a termination signal ET in the set of operating signals $D_{PWM}$, RST, DFS, as discussed in the following.

As exemplified herein, a device comprises a supply node configured to be coupled to an electric energy source to receive a supply voltage $V_{IN}$. An output node is configured to be coupled to a load $C_O$, $Z_L$ to provide thereto a regulated output voltage $V_O$ based on the supply voltage $V_{IN}$. A switching stage $M_P$, $M_N$, L intermediate the supply node and the output node, the switching stage comprises at least one switching transistor $M_P$, $M_N$ having a control node configured to receive a drive signal $D_{PWM}$, $T_{ON}$, the at least one switching transistor having a current flow path therethrough configured to be made conductive in response to the drive signal having a first value and non-conductive in response to the drive signal having a second value.

A control circuit 30 is coupled to the switching stage to control a switching activity thereof. The control circuit 30 comprises sensing circuitry $R_1$, $R_2$ coupled to the output node of the device and configured to sense a feedback voltage $V_{FB}$ indicative of the regulated output voltage. A comparator 32 is coupled to the sensing circuitry to receive the feedback voltage therefrom, the comparator configured to provide a comparison logic signal C having a first logic value in response to the feedback signal falling within a comparison range $V_P$; $V_T$ and a second logic value in response to the feedback signal falling outside the comparison range. Logical circuitry 34 has a first input node coupled to the comparator to receive the comparison logic signal therefrom and a second input node configured to receive a forcing logic signal DFS admitting a first logic value and a second logic value. The logical circuitry is configured to provide a skip signal NS having a first value in response to at least one of the comparison signal and the forcing signal having their respective first value, the skip signal having a second value in response to the comparison signal and the forcing signal both having their respective second value. A counter 40 is configured to produce a termination signal ET based on the forcing signal DFS. Signal processing circuitry 11, 36 is coupled to the logical circuitry to receive therefrom the skip signal and to the counter to receive therefrom the termination signal. The signal processing circuitry is configured to control the switching activity of the switching stage by asserting the drive signal to the first value as a function of the skip signal and the termination signal.

As exemplified in FIG. 3, the comparator 32 may be provided with input selecting switches $S_P$, $S_N$ to implement a window comparator having a hysteretic behavior to compare the feedback signal $V_{FB}$ with one of two slightly shifted thresholds $V_P$, $V_N$ around the desired output setpoint (e.g., $V_P = V_T + 0.2V$, $V_N = V_T - 0.2V$).

As exemplified herein, the counter 40 may be implemented as an analog timer (e.g., continuous time counter) by changing resistance R and/or capacitance C and/or reference voltage $V_{REF}$ so as to select the minimum time length value $T_{MIN}$, e.g., in order to set a peak current value of the inductor coil L at which the DC-DC converter operates in skip-mode as a result. For instance, determining the minimum time length value $T_{MIN}$ comprises: dynamically adjusting the minimum length value based on a setpoint value $V_{OUT}$ for the regulated output voltage $V_O$; or setting the minimum time length as a, e.g., user-defined, constant threshold value.

As exemplified herein, a time interval during which the drive signal is asserted to the first value has a constant time length $T_{MIN}$.

Figure 4:
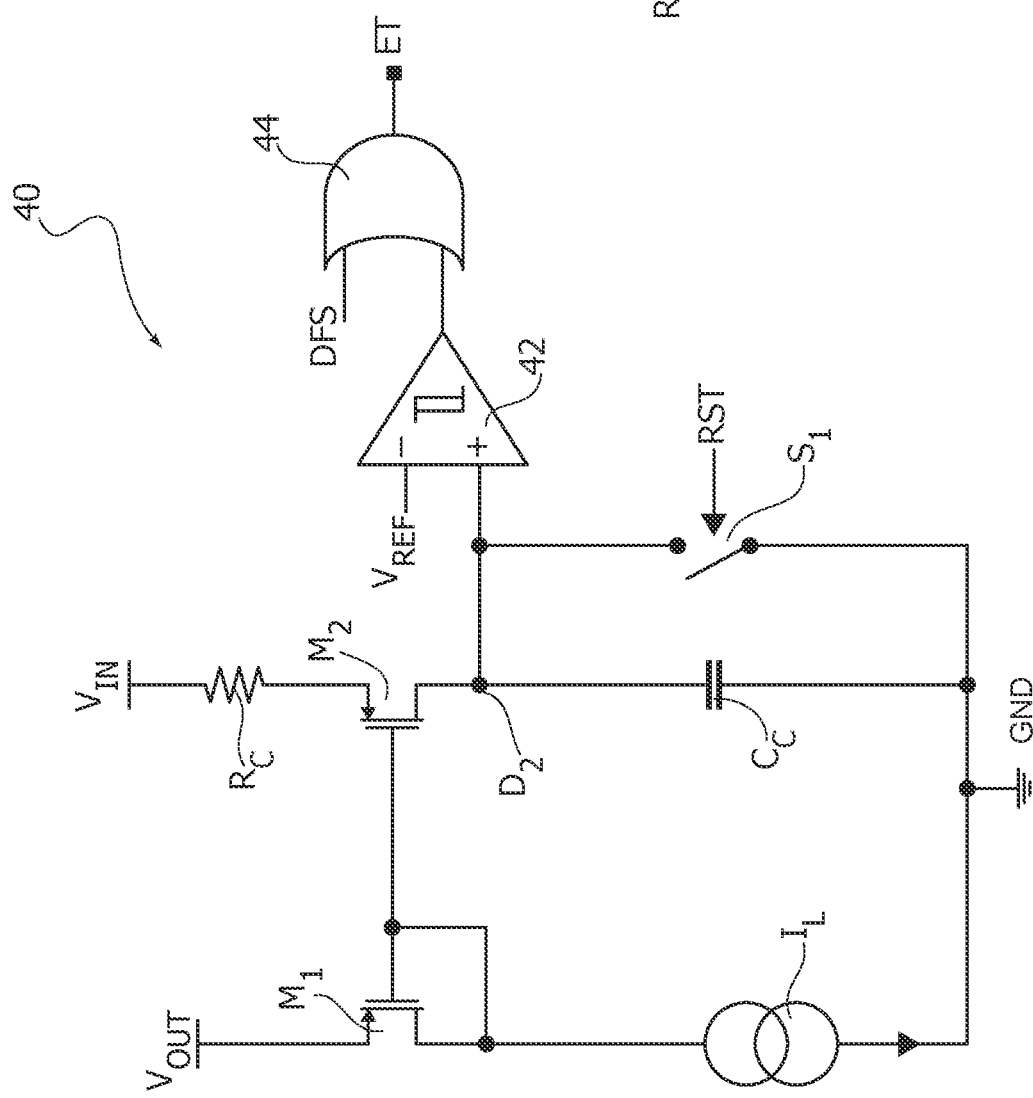
FIG. 4 is a diagram exemplary of a counter circuit.

As exemplified in FIG. 4, the counter 40 is implemented via an analog counter comprising a first transistor $M_1$ coupled to a setpoint output voltage level $V_{OUT}$ indicative of the regulated voltage $V_O$ at the output node $V_O$ of the converter and a second transistor $M_2$ coupled to the input node $V_{IN}$ via a resistance R. A capacitor $C_C$ referred to ground is coupled to the second transistor $M_2$ at a transistor (e.g., drain) node $D_2$. A comparator 42 has a first (e.g., non-inverting) input node coupled to the transistor node $D_2$ and a second (e.g., inverting) input node coupled to a reference voltage $V_{REF}$ indicative of a minimum time length value $T_{MIN}$ (that may be selected by a user based on a specific application). The comparator 42 is configured to perform a comparison between the voltage across the capacitor $C_C$ and the reference voltage $V_{REF}$ and to provide a comparison signal C having a first value (e.g., "low" or "0") as a result of the voltage across the capacitor $C_C$ failing to reach the voltage reference $V_{REF}$ a second value (e.g., "high" or "1") as a result of voltage across the capacitor $C_C$ reaching or exceeding the voltage reference $V_{REF}$. A discharge switch $S_1$ is coupled in parallel to the capacitor between the transistor node $D_2$ and ground. The discharge switch $S_1$ is configured to be made conductive to provide a current flow line for discharging the capacitor $C_C$ in response to a reset control signal RST in the set of control signals having a first value (e.g., "1") and configured to be made non-conductive in response to a reset control signal RST in the set of control signals having a second value (e.g., "0"). A further logic OR circuit block 44 coupled to the comparator 42 to receive the result of the comparison therefrom and configured to receive the forcing signal DFS, e.g., from an external circuit providing it at a dedicated pin.

As exemplified herein, a time interval during which the drive signal is asserted to the first value has a length $T_{MIN}$ that is determined based on a difference between a first instant in which a reset control signal RST has a first edge and a second instant in which the termination signal has a second edge.

As exemplified herein, the counter comprises: a first transistor $M_1$ and a second transistor $M_2$ having respective control nodes coupled therebetween, the first transistor $M_1$ having a first transistor node coupled to a setpoint voltage level $V_{OUT}$ of the regulated output voltage $V_O$ and a second transistor node coupled to a current generator $I_L$ referred to ground GND, the second transistor $M_2$ having a respective first transistor node coupled to the supply node $V_{IN}$ of the voltage regulator 10 via a resistive input branch R and a respective second transistor node $D_2$ coupled to the capacitor $C_C$ referred to ground GND. A further comparator 42 has a first input node coupled to the second transistor node of the second transistor and a second input node coupled to a reference voltage $V_{REF}$, wherein the further comparator is configured to perform a comparison between a voltage across the load capacitor $C_C$ and the reference voltage $V_{REF}$, and provide a second comparison logic signal having a first logic value as a result of the voltage across the capacitor $C_C$ reaching the voltage reference and a second logic value as a result of voltage across the capacitor failing to reach the voltage reference. Further logical circuitry has a first input node coupled to the further comparator to receive the second comparison logical signal and a second input node configured to receive the forcing signal. The further logical circuitry is configured to provide the termination signal having a first value in response to at least one of the second comparison signal and the forcing signal having their respective first value, the termination signal having a second value in response to the comparison signal and the forcing signal both having their respective second value. A discharge switch $S_1$ referred to ground is coupled in parallel to the load capacitor. The discharge switch is configured to be made conductive in response to a reset control signal having a first value and configured to be made non-conductive in response to the reset control signal having a second value.

For instance, the discharge switch, in response to being made conductive, is configured to provide a current flow line to discharge the capacitor $C_C$.

As exemplified herein, the control circuit 36 comprises a time-based control circuit 11 configured to control the switching activity of the switching stage by asserting the drive signal to the first value for a time interval that is a function of the skip signal and the termination signal.

As exemplified herein, the switching stage $M_P$, $M_N$, L comprises a switching node $L_X$ intermediate the supply node $V_{IN}$ and the output node $V_O$. A first switching transistor $M_P$ has a control node configured to receive said drive signal $D_{PWM}$, $T_{ON}$ as well as a current flow path therethrough between the supply node and the switching node of the switching stage, wherein the current flow path through said first switching transistor is configured to be made conductive in response to the drive signal having a first value and non-conductive in response to the drive signal having a second value. The current flow path through the first switching transistor provides a current flow line between the supply node and the switching node of the switching stage. A second switching transistor $M_N$ has a control node configured to receive the drive signal as well as a current flow path therethrough between the switching node of the switching stage and ground GND, wherein the current flow path through said second switching transistor is configured to be made conductive in response to the drive signal having the second value and non-conductive in response to the drive signal having the first value. The current flow path through the second switching transistor provides a current flow line between the switching node $L_X$ and ground GND, wherein the switching stage is configured to provide the regulated output voltage $V_O$ to the output node.

For instance, the switching stage $M_P$, $M_N$, L comprises a switching node $L_X$ intermediate the supply node $V_{IN}$ and the output node $V_O$ and at least one energy storage element L, $C_O$ coupled to the switching node $L_X$ and to the output node $V_O$, wherein the switching stage $M_P$, $M_N$, L is configured to provide the regulated output voltage $V_O$ to the output node via the at least one energy storage element L, $C_O$.

As exemplified herein, the at least one energy storage element L, $C_O$ comprises an inductor L coupled to the switching stage and to the output node, and a capacitor $C_O$ referred to ground coupled to the output node, wherein the switching stage is configured to provide the regulated output voltage $V_O$ to the output node via the inductor L and the capacitor $C_O$.

As exemplified herein, the reset control signal RST may be provided by the time-based controller 11, in a manner per se known. For instance, the reset signal RST is asserted to the first value (e.g., "1") when the analog counter has reached the value of the minimum $T_{ON}$ and is asserted to a second value (e.g., "0") at the moment of the next, new switching cycle, so that the counter starts over from zero until reaching again minimum $T_{ON}$.

Figure 5:
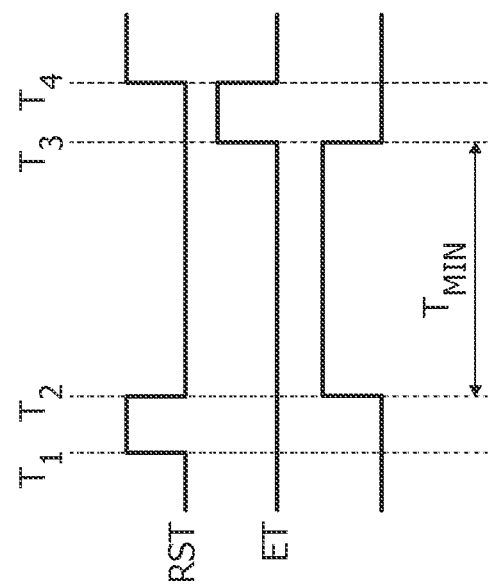
FIG. 5 is a diagram exemplary of an evolution over time of some signals of the circuit exemplified in FIGS. 3 and 4.

As exemplified in FIGS. 3 to 5, the minimum time length value $T_{MIN}$ may be adjusted dynamically, in order to maintain a peak current value $I_L^{PK}$ of the current $I_L$ flowing in the inductance L coupled to the switching node $L_X$ of the converter.

As exemplified in FIGS. 4 and 5, for instance, at a first time instant $T_1$, the reset signal RST has the first value (e.g., "1"), so that the discharge switch $S_1$ is closed, short circuiting the capacitor $C_C$. At time instant $T_2$, the reset signal RST has a second value (e.g., "0") so that the capacitor $C_C$ is charged with a current $I_C=(V_{IN}-V_O)/R$. At time instant $T_3$, the voltage at the transistor node $D_2$ input to the comparator 42 reaches the voltage reference value $V_{REF}$ and, in case the forcing signal DFS has the second (e.g., "0") value, the termination signal ET is output with the first value (e.g., "1") as a result of the comparison.

As a result, for instance, the minimum time length $T_{MIN}$ is set to have a pulse duration equal to the time interval between a falling edge of the reset signal RST and a subsequent rising edge of the termination signal ET.

In the exemplary scenario of a (e.g., buck) DC-DC converter as exemplified in FIG. 3, in the case in which it is operated in discontinuous-conduction mode (briefly, DCM), the peak current value may be expressed as:

$$I_L^{PK} = T_{ON} * (V_{IN} - V_O)/L$$

where $T_{ON}$ is a time interval in which the first one $M_P$ of the switching transistors $M_P$, $M_N$ of the converter 10 is in the ON state.

In the exemplary scenario exemplified in FIG. 4, when the converter 10 comprising the analog counter 40 is operated exempt from any load $Z_L$ coupled thereto, the minimum length of the on-time $T_{ON}$ of the duty cycle signal $D_{PWM}$ corresponds to the minimum time length value $T_{MIN}$, so that it can be expressed as:

$$\min(T_{ON}) * (V_{IN} - V_O)/R = C_C * V_{REF}$$

As a result, for instance, the minimum time length value may be expressed as a constant value, e.g.:

$$T_{MIN} = (R * C_C * V_{REF})/L$$

Figure 6:
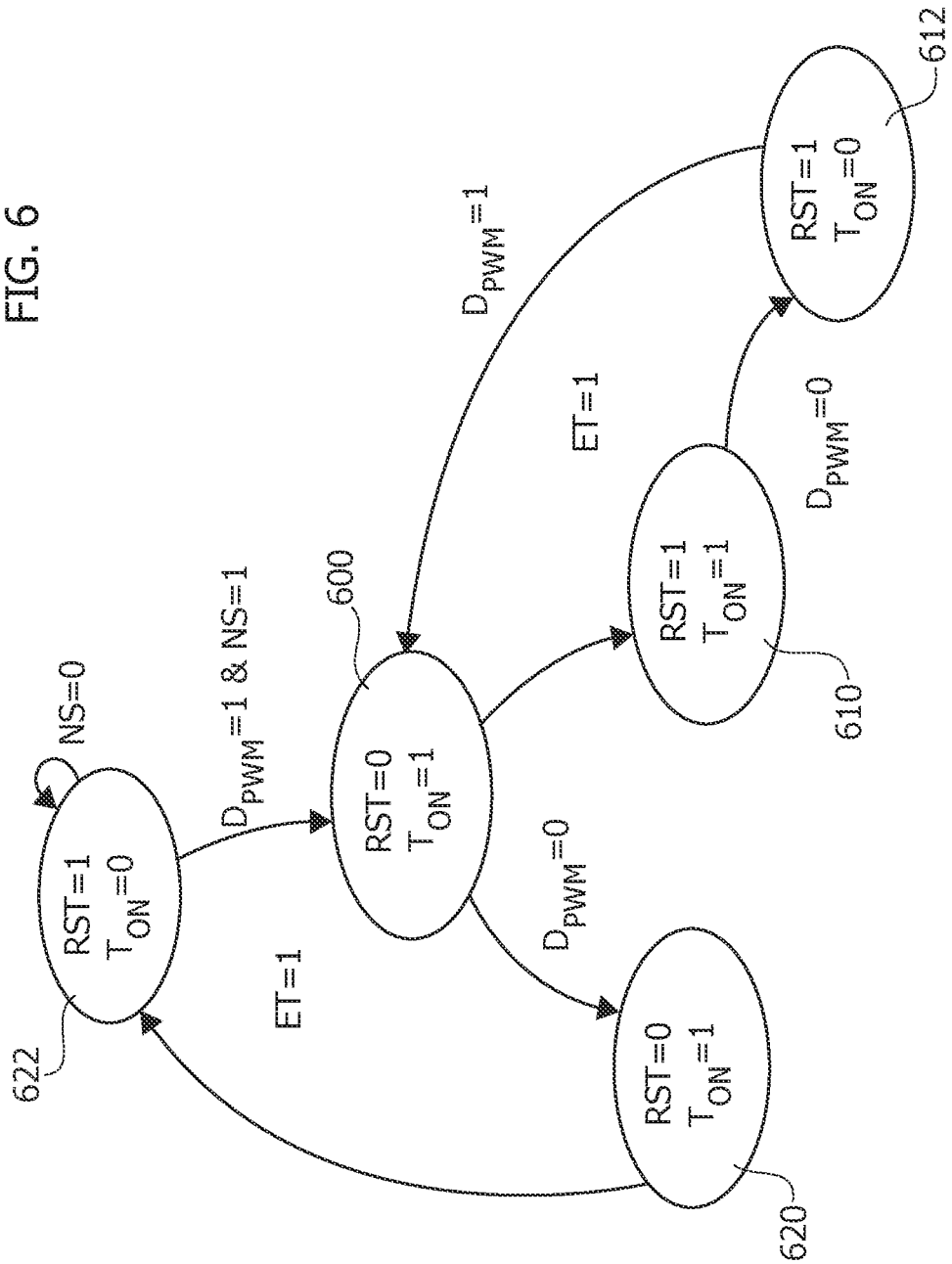
FIG. 6 is a state diagram exemplary of a method.

In one or more embodiments the FSM 36 may be configured to operate as exemplified in FIG. 6.

For instance, by measuring the duty cycle signal $D_{PWM}$ (specifically, the ON-time duration) provided by the time-based controller 11, skip-mode operation can be initiated in response to the ON-time duration falling below the minimum time length value $T_{MIN}$, a condition referred to as "threshold violation". In the exemplary scenario considered, as a result of detecting such a threshold violation condition, for instance, the comparator 32 of the improved control circuit 30 facilitates, for each switching cycle, detecting whether it is necessary to start a new one (e.g., energizing the inductive coil L to provide output charge) or to wait and skip the cycle (e.g., since the output level exceeds the setpoint).

As exemplified in FIG. 6, in an initial state 600: the reset signal RST has the second value (e.g., "0"), so that, e.g., the counter 40 is released from its reset state; and the duty cycle signal $D_{PWM}$ has the first value (e.g., "1"), so that, e.g., the first switching transistor $M_1$ is turned on by the driver 100.

As exemplified in FIG. 6, the FSM 36 is configured to, alternatively, drive the switching transistors: in PWM operating mode 600, 610, 612, when the load $Z_L$ is coupled to the output node $V_O$ and when the on-time being above the minimum time length value $T_{MIN}$; and in skip mode 600, 620, 622 when the load $Z_L$ is absent or is decoupled from the output node $V_O$, when the on-time falls below the minimum time length value $T_{MIN}$.

As exemplified in FIG. 6, in PWM operation, for instance: from the initial state 600, in response to the termination signal ET, the first drive signal $T_{ON}$ has a second value (e.g., "0") and the reset signal RST having a first value (e.g., "1"), the FSM 36 moves to the first PWM mode state 610; from the first PWM state 610, in response to the duty cycle signal $D_{PWM}$ having the second value (e.g., "0"), the first switching transistor $M_P$ is turned off in response to the first drive signal $T_{ON}$ having the second value and the FSM 36 jumps to the second PWM state 612 in which the reset signal RST maintains the first value (e.g., "1"); and from the second PWM state 612, in response to the duty cycle signal $D_{PWM}$ having again the first value (e.g., "1"), the FSM 36 jumps back to the initial state 600, in which the reset signal RST is asserted with the second value (e.g., "0") while the first switching transistor $M_P$ is turned on in response to the first drive signal $T_{ON}$ having the first value (e.g., "1").

As exemplified in FIG. 6, in skip mode operation, for instance: from the initial state 600, in response to the duty cycle signal $D_{PWM}$ and the termination signal ET having the second value (e.g., "0"), the first drive signal $T_{ON}$ has the first value (e.g., "1") for a time equal to the minimum time length value $T_{MIN}$, while the reset signal RST maintains the initial value (e.g., "0"), so that the FSM 36 moves to the first skip mode state 620; from the first skip mode state 620, in response to the termination signal ET having the first value (e.g., "1") the FSM 36 moves to state 622 in which the reset signal RST has the first value (e.g., "1") and the on-time signal $T_{ON}$ has the second value (e.g., "0") so that the first switching transistor $M_P$ is turned-off (that is, made non-conductive).

For instance, when the duty cycle signal $D_{PWM}$ has an on-time duration below the minimum time length value $T_{MIN}$, the DC-DC converter 10 is forced to keep turned on (that is, made conductive) the first switching transistor $M_P$ for an on-time lasting at least for the minimum time length value $T_{MIN}$. In this way, e.g., on-time is forced to become extended to a time-length value that is determined by the minimum time length $T_{MIN}$.

As exemplified in FIG. 6, still in the skip mode operation, for instance: from the second skip mode state 622, in response to both the duty cycle signal $D_{PWM}$ set by the time-based controller 11 and the skip signal NS has the first value (e.g., "1") as a result of the output regulated voltage VO being below the setpoint (optionally, lower $V_N$) threshold, the FSM moves back to the initial state 600; conversely, in case the skip signal NS has the second value (e.g., "0") as a result of the feedback voltage $V_{FB}$ being above the (e.g., optionally upper $V_P$) threshold $V_T$ of the skip comparator 32, the next switching cycle 600, 610, 612 is skipped.

For instance, next switching cycle is initiated when both the skip signal NS and the $D_{PWM}$ signal from the time-based controller 11 have the first value (e.g., "1"), e.g., independently of whether through the PWM loop 610, 612 or the skip loop 620, 622.

In general, more than one cycle may be skipped, in fact the switching activity is restarted back only when the skip comparator 32 acknowledges that the output voltage $V_O$ is lower than a minimum level (e.g., NS=1), meaning that providing charge at the output involves energizing the inductor L.

Figure 7:
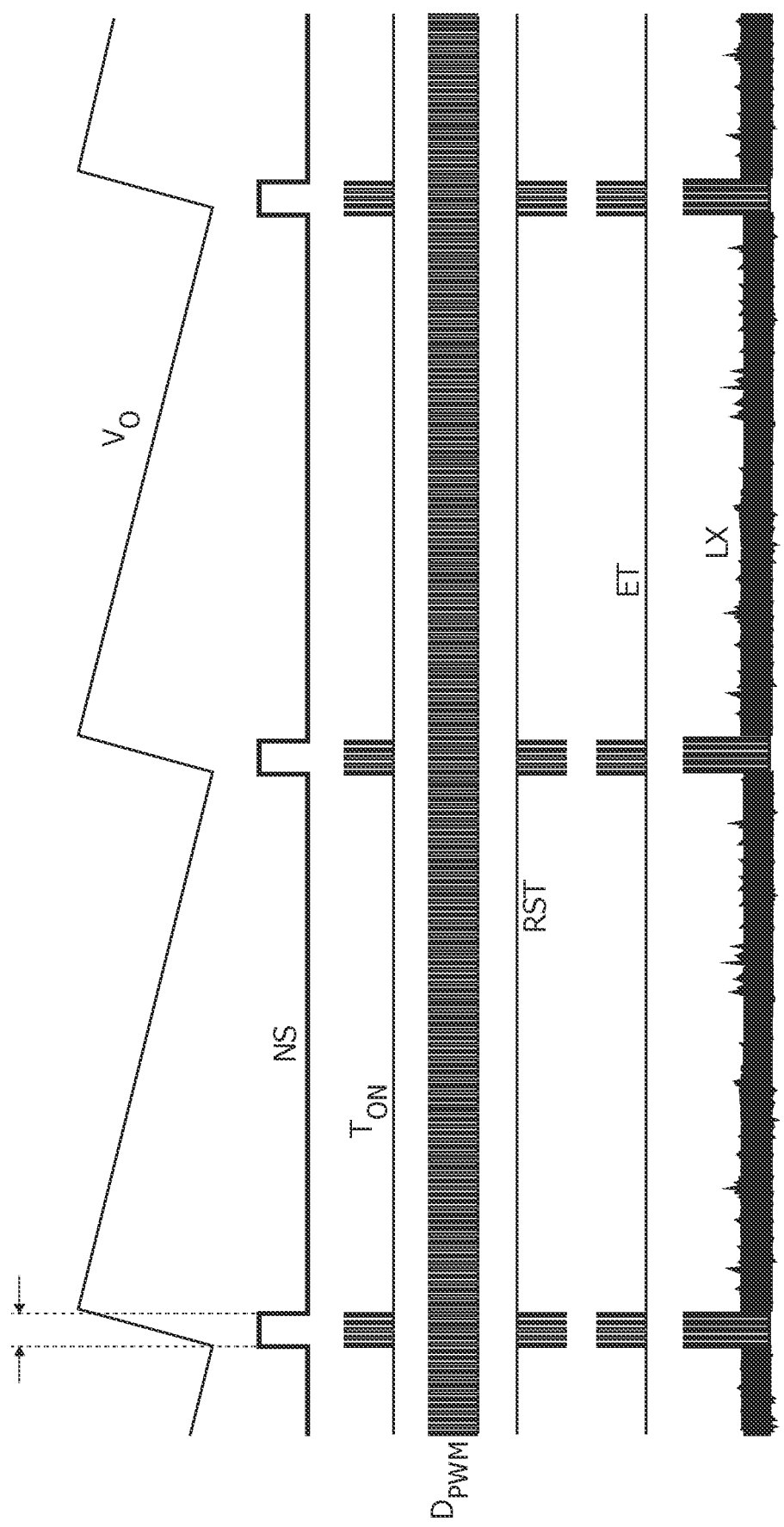
FIG. 7 is a diagram exemplary of an evolution over time of signals of the circuit exemplified in FIG. 3.

As exemplified in FIG. 7, thanks to the presence of the skip loop 600, 620, 622 of the FSM 36, the time-based DC-DC converter 10 operates in a sort of hysteretic fashion, providing packets (or energization cycles) of electrical charge from an initial time instant O and until, at a subsequent time instant K, the regulated output voltage $V_O$ exceeds the setpoint threshold $V_T$.

Figure 8:
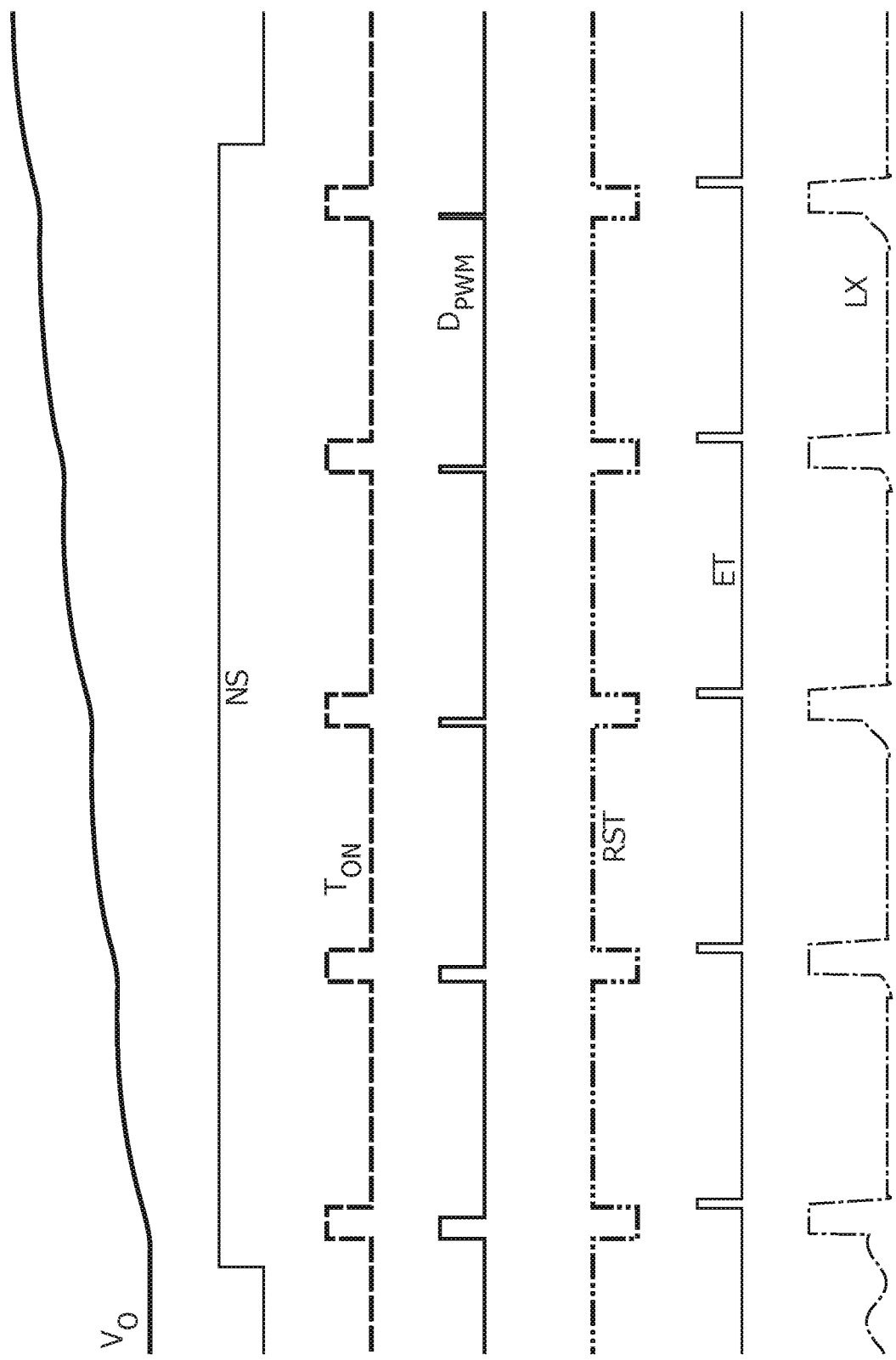
FIG. 8 is an enlarged view of a portion of the diagram of FIG. 7.

FIG. 8 is an enlarged view of the portion of FIG. 7 in the time interval 0-K.

As exemplified in FIG. 8, the output signal $V_O$ has a limited ripple. For instance, the hysteretic-range arrangement 33 of the skip comparator 32 facilitates controlling voltage ripple.

As exemplified in FIGS. 7 and 8, the duty-cycle of the converter (that is, the time length during which drive signal $T_{ON}$ has the first value) is fixed and greater than the "natural" duty cycle of the PWM signal $D_{PWM}$ (e.g., provided by the time-based controller 11).

For the sake of simplicity, one or more embodiments are discussed here with respect to discontinuous-conduction mode (DCM) operation of the converter circuit 10, so that an amplitude of the current flowing in the inductive component L does not lead to discharging the load $Z_L$ to the input $V_{IN}$, in a manner per se known. It is noted that such an operation mode is purely exemplary and in no way limiting.

As exemplified in FIGS. 7 and 8, in DCM mode the current signal through the inductor coil L is reset (to zero) at the beginning of each "energization cycle" in the time interval O-K, so that, for instance, at the end of the energization cycle the inductive coil L results (e.g., completely) discharged (that is, it stores zero energy).

One or more embodiments may comprise a zero-crossing-detector (ZCD) facilitate preventing reversal (e.g., becoming negative) of the current through the coil L, preferably in applications using DCM operation. For instance, the ZCD comparator may be configured to detect when the current through the coil L reaches zero and may be coupled to the FSM 36 to provide the second drive signal to turn off the second switching transistor $M_N$ at the detected zero-crossing time interval, e.g., keeping the coil current at zero as a result.

In some applications employing CCM (continuous conduction mode) reversal of the coil current may be tolerated so that the ZCD may be deactivated (this is known as forced-CCM operation suitable for synchronous rectification, in a manner known per se).

In an exemplary scenario, the converter 10 can start from a condition in which the FSM 36 is in any state of the skip loop 600, 620, 622 and an amplitude of a current flowing in the load $Z_L$ is negligible.

In the considered exemplary scenario, after some time, the load current is increased, so that the output regulated voltage $V_O$ is "discharged" at a faster rate.

Still in the considered exemplary scenario, to compensate the faster "discharge" of the voltage $V_O$, the time-based controller 11 produces a PWM signal $D_{PWM}$ with an increasing duty-cycle, until this is so high that the minimum $T_{ON}$ pulse performed within the skip loop goes beyond the "inertia" of the components of the converter circuit.

In one or more embodiments, the moment in which such a threshold $T_{MIN}$ is exceeded triggers the termination signal ET to switch to the first value (e.g., "1") just before the PWM signal $D_{PWM}$ switches to the second value. As a result, the converter 10 swiftly transitions to being operated according to the PWM cycle 600, 610, 612 of the FSM 36.

In a further exemplary scenario, complementary to the one discussed in the foregoing, in case the FSM is in any state of the PWM-mode operation 600, 610, 612, when the load current reduces, the time-based controller 11 reacts reducing the duty-cycle of the PWM signal $D_{PWM}$ in order to compensate reduction of current through the load, until a level of current flow in the load is selected based on the selected minimum time length $T_{MIN}$. At this point, for instance, the PWM signal $D_{PWM}$ switches from the first value to the second value while the termination signal ET remains at the second value.

A system as exemplified herein comprises: a device as per the present disclosure having a supply node $V_{IN}$ configured to receive a supply voltage $V_{IN}$ and an output node $V_O$ configured to provide a regulated output voltage $V_O$ based on the supply voltage $V_{IN}$, a battery PS configured to provide the supply voltage to the supply node of the device, a load $Z_L$ coupled to the output node $V_O$ of the device to receive therefrom the regulated output voltage $V_O$.

A method as exemplified herein comprises controlling 30 a switching activity of a switching stage $M_P$, $M_N$, L of a device as per the present disclosure. Controlling 30 the switching activity comprises: sensing a feedback voltage $V_{FB}$ indicative of a regulated output voltage $V_O$ provided to an output node of the device based on a supply voltage $V_{IN}$ received at an input node of the device, performing a comparison 32 of the sensed feedback voltage $V_{FB}$ and a comparison range $V_P$; $V_T$, providing as a result a comparison logic signal C having a first logic value in response to the feedback signal $V_{FB}$ falling within the comparison range $V_P$, $V_T$ and a second logic value in response to the feedback signal $V_{FB}$ falling outside the comparison range $V_N$; $V_T$. Then, providing a forcing logic signal DFS admitting a first logic value and a second logic value and applying logical processing 34 to the comparison logic signal C and to the forcing logic signal DFS, providing as a result a skip signal NS having a first value in response to at least one of the comparison signal C and the forcing signal DFS having their respective first logic value, the skip signal NS having a second value in response to the comparison signal C and the forcing signal DFS both having their respective second logic value, producing a termination signal ET based on the forcing signal DFS, asserting 11, 36 the drive signal $D_{PWM}$, $T_{ON}$ to the first value as a function of the skip signal NS and the termination signal ET.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

The claims are an integral part of the technical teaching provided herein with reference to the embodiments.

Without prejudice to the underlying principles, the details and embodiments may vary, even significantly, with respect to what has been described by way of example only, without departing from the extent of protection. The extent of protection is defined by the annexed claims.

The invention claimed is:

1. A device, comprising:
a supply node configured to be coupled to an electric energy source to receive a supply voltage;
an output node configured to be coupled to a load to provide thereto a regulated output voltage based on the supply voltage;
a switching stage intermediate the supply node and the output node, the switching stage comprising at least one switching transistor having a control node configured to receive a drive signal, the at least one switching transistor having a current flow path therethrough configured to be made conductive in response to the drive signal having a first value and non-conductive in response to the drive signal having a second value; and
a control circuit coupled to said switching stage to control a switching activity thereof, wherein the control circuit comprises:
sensing circuitry coupled to the output node of the device and configured to sense a feedback voltage indicative of said regulated output voltage;
a comparator coupled to said sensing circuitry to receive said feedback voltage therefrom, the comparator configured to provide a comparison logic signal having a first logic value in response to the feedback signal falling within a comparison range and a second logic value in response to the feedback signal falling outside said comparison range;
logical circuitry having a first input node coupled to the comparator to receive said comparison logic signal therefrom and a second input node configured to receive a forcing logic signal admitting a first logic value and a second logic value, the logical circuitry configured to provide a skip signal having a first value in response to at least one of the comparison signal and the forcing logic signal having their respective first logic value, the skip signal having a second value in response to the comparison signal and the forcing logic signal both having their respective second logic value;

a counter configured to produce a termination signal based on said forcing logic signal; and signal processing circuitry coupled to the logical circuitry to receive therefrom the skip signal and to the counter to receive therefrom the termination signal, the signal processing circuitry configured to control said switching activity of said switching stage asserting said drive signal to said first value as a function of said skip signal and said termination signal; and wherein said control circuit comprises a time-based control circuit configured to control said switching activity of said switching stage by asserting said drive signal to said first value as a function of said skip signal and said termination signal; and wherein the time-based control circuit includes current-controlled oscillators generating oscillating signals dependent on the output signal, current-controlled delay lines configured to delay the oscillating signals dependent on a resistor capacitor filtering of the output signal, and a phase detector configured to compare phases of delayed signals output from the current-controlled delay lines to output the drive signal.

2. The device of claim 1, wherein a time interval during which said drive signal is asserted to said first value has a constant time length.

3. The device of claim 1, wherein a time interval during which said drive signal is asserted to said first value has a length that is determined based on a difference between a first instant in which a reset control signal has a first edge and a second instant in which said termination signal has a second edge.

4. The device of claim 1, wherein said switching stage comprises:

a switching node intermediate said supply node and said output node;

a first switching transistor having a control node configured to receive said drive signal as well as a current flow path therethrough between said supply node and said switching node of said switching stage, wherein said current flow path through said first switching transistor is configured to be made conductive in response to the drive signal having a first value and non-conductive in response to the drive signal having a second value, wherein the current flow path through said first switching transistor provides a current flow line between said supply node and said switching node of said switching stage; and a second switching transistor having a control node configured to receive said drive signal as well as a current flow path therethrough between said switching node of said switching stage and ground, wherein said current flow path through said second switching transistor is configured to be made conductive in response to the drive signal having the second value and non-conductive in response to the drive signal having the first value, wherein the current flow path through said second switching transistor provides a current flow line between said switching node and ground;

wherein said switching stage is configured to provide said regulated output voltage to said output node.

5. The device of claim 1, wherein said switching stage comprises a switching node intermediate said supply node and said output node and at least one energy storage element coupled to said switching node and to said output node, wherein said switching stage is configured to provide said regulated output voltage to said output node via said at least one energy storage element.

6. The device of claim 5, wherein said at least one energy storage element comprises:

an inductor coupled to the switching stage and to said output node; and a capacitor referred to ground coupled to said output node;

wherein said switching stage is configured to provide said regulated output voltage to said output node via said inductor and said capacitor.

7. A system, comprising:
the device according claim 1;
a battery configured to provide said supply voltage;
a load coupled to said output node to receive therefrom said regulated output voltage.

8. A device, comprising:

a supply node configured to be coupled to an electric energy source to receive a supply voltage;

an output node configured to be coupled to a load to provide thereto a regulated output voltage based on the supply voltage;

a switching stage intermediate the supply node and the output node, the switching stage comprising at least one switching transistor having a control node configured to receive a drive signal, the at least one switching transistor having a current flow path therethrough configured to be made conductive in response to the drive signal having a first value and non-conductive in response to the drive signal having a second value; and a control circuit coupled to said switching stage to control a switching activity thereof, wherein the control circuit comprises:

sensing circuitry coupled to the output node of the device and configured to sense a feedback voltage indicative of said regulated output voltage;

a comparator coupled to said sensing circuitry to receive said feedback voltage therefrom, the comparator configured to provide a comparison logic signal having a first logic value in response to the feedback signal falling within a comparison range and a second logic value in response to the feedback signal falling outside said comparison range;

logical circuitry having a first input node coupled to the comparator to receive said comparison logic signal therefrom and a second input node configured to receive a forcing logic signal admitting a first logic value and a second logic value, the logical circuitry configured to provide a skip signal having a first value in response to at least one of the comparison signal and the forcing logic signal having their respective first logic value, the skip signal having a second value in response to the comparison signal and the forcing logic signal both having their respective second logic value;

a counter configured to produce a termination signal based on said forcing logic signal; and signal processing circuitry coupled to the logical circuitry to receive therefrom the skip signal and to the counter to receive therefrom the termination signal, the signal processing circuitry configured to control said switching activity of said switching stage asserting said drive signal to said first value as a function of said skip signal and said termination signal;

wherein a time interval during which said drive signal is asserted to said first value has a length that is determined based on a difference between a first instant in which a reset control signal has a first edge and a second instant in which said termination signal has a second edge;

wherein said counter configured to produce the termination signal based on said forcing logic signal comprises:
- a first transistor and a second transistor having respective control nodes coupled therebetween, the first transistor having a first transistor node coupled to a setpoint voltage level and a second transistor node coupled to a current generator referred to ground, the second transistor having a respective first transistor node coupled to the supply node of said device via a resistive input branch and a respective second transistor node coupled to a capacitor referred to ground;
- a further comparator having a first comparator input node coupled to the second transistor node of the second transistor and a second comparator input node coupled to a reference voltage, wherein the further comparator is configured to perform a comparison between a voltage across the capacitor and the reference voltage, providing a further comparison signal having a first logic value as a result of the voltage across the capacitor reaching the voltage reference and a second logic value as a result of voltage across the capacitor failing to reach the voltage reference;
- further logical circuitry having a first input node coupled to the further comparator to receive the further comparison signal and a second input node configured to receive the forcing logic signal, the further logical circuitry configured to provide the termination signal having a first value in response to at least one of the further comparison signal and the forcing logic signal having their respective first logic value, the termination signal having a second value in response to the further comparison signal and the forcing logic signal both having their respective second logic value; and
- a discharge switch referred to ground and coupled in parallel to the capacitor, the discharge switch configured to be made conductive in response to a reset control signal having a first value and configured to be made non-conductive in response to said reset control signal having a second value, wherein the discharge switch, in response to being made conductive, is configured to provide a current flow line between said second transistor node and ground.

9. The device of claim 8, wherein said switching stage comprises:
- a switching node intermediate said supply node and said output node;
- a first switching transistor having a control node configured to receive said drive signal as well as a current flow path therethrough between said supply node and said switching node of said switching stage, wherein said current flow path through said first switching transistor is configured to be made conductive in response to the drive signal having a first value and non-conductive in response to the drive signal having a second value, wherein the current flow path through said first switching transistor provides a current flow line between said supply node and said switching node of said switching stage; and
- a second switching transistor having a control node configured to receive said drive signal as well as a current flow path therethrough between said switching node of said switching stage and ground, wherein said current flow path through said second switching transistor is configured to be made conductive in response to the drive signal having the second value and non-conductive in response to the drive signal having the first value, wherein the current flow path through said second switching transistor provides a current flow line between said switching node and ground;
wherein said switching stage is configured to provide said regulated output voltage to said output node.

10. The device of claim 8, wherein said switching stage comprises a switching node intermediate said supply node and said output node and at least one energy storage element coupled to said switching node and to said output node, wherein said switching stage is configured to provide said regulated output voltage to said output node via said at least one energy storage element.

11. The device of claim 10, wherein said at least one energy storage element comprises:
- an inductor coupled to the switching stage and to said output node; and
- a capacitor referred to ground coupled to said output node;
wherein said switching stage is configured to provide said regulated output voltage to said output node via said inductor and said capacitor.

12. A system, comprising:
the device according claim 4;
a battery configured to provide said supply voltage;
a load coupled to said output node to receive therefrom said regulated output voltage.

13. A device, comprising:
a switching stage coupled between a supply node and an output node;
wherein the switching stage comprises a switching transistor controlled by a drive signal; and
a control circuit configured to generate said drive signal with a pulse width modulated (PWM) on time;
wherein the control circuit comprises:
- a feedback circuit configured to generate a feedback signal dependent on an output voltage at the output node;
- a comparator configured to compare the feedback signal to a comparison range and generate a skip duration signal in response to said comparison;
- a counter configured to generate a termination signal indicative of a minimum time duration for PWM on time; and
- signal processing circuitry configured to: generate a force skip control signal when the PWM on time is less than the minimum time duration indicated by the termination signal, control a forced logic state of the drive signal to turn on the switching transistor in response to the force skip control signal, and control a duration of the forced logic state based on the skip duration signal; and
wherein said control circuit comprises a time-based control circuit configured to control said switching activity of said switching stage by asserting said drive signal to said first value as a function of said skip signal and said termination signal; and wherein the time-based control circuit includes current-controlled oscillators generating oscillating signals dependent on the output signal, current-controlled delay lines configured to delay the oscillating signals dependent on a resistor capacitor filtering of the output signal, and a phase detector configured to compare phases of delayed signals output from the current-controlled delay lines to output the drive signal.

14. A system, comprising:
the device according claim 13;
a battery configured to provide said supply voltage;
a load coupled to said output node to receive therefrom said regulated output voltage.

15. A device, comprising:
a switching stage coupled between a supply node and an output node;
wherein the switching stage comprises a switching transistor controlled by a drive signal; and
a control circuit configured to generate said drive signal with a pulse width modulated (PWM) on time;
wherein the control circuit comprises:
  a feedback circuit configured to generate a feedback signal dependent on an output voltage at the output node;
  a comparator configured to compare the feedback signal to a comparison range and generate a skip duration signal in response to said comparison;
  a counter configured to generate a termination signal indicative of a minimum time duration for PWM on time; and
  signal processing circuitry configured to: generate a force skip control signal when the PWM on time is less than the minimum time duration indicated by the termination signal, control a forced logic state of the drive signal to turn on the switching transistor in response to the force skip control signal, and control a duration of the forced logic state based on the skip duration signal;
wherein said counter comprises:
  a first transistor and a second transistor having respective control nodes coupled therebetween, the first transistor having a first transistor node coupled to the output node and a second transistor node coupled to a current generator referred to ground, the second transistor having a respective first transistor node coupled to the supply node and a respective second transistor node coupled to a capacitor referred to ground; and
  a further comparator configured to compare a voltage across to the capacitor to a reference voltage and generate said termination signal.

16. The device of claim 15, wherein the counter further comprises a reset circuit configured to reset the voltage across the capacitor in response to a reset signal, wherein the minimum time duration for PWM on time is a time between assertion of the reset signal and assertion of the termination signal.

17. A system, comprising:
the device according claim 15;
a battery configured to provide said supply voltage;
a load coupled to said output node to receive therefrom said regulated output voltage.

* * * * *